June 12, 1956 J. M. KEMPER ET AL 2,749,828
PRESSURE REGULATING MECHANISM
Filed July 25, 1951 2 Sheets-Sheet 1
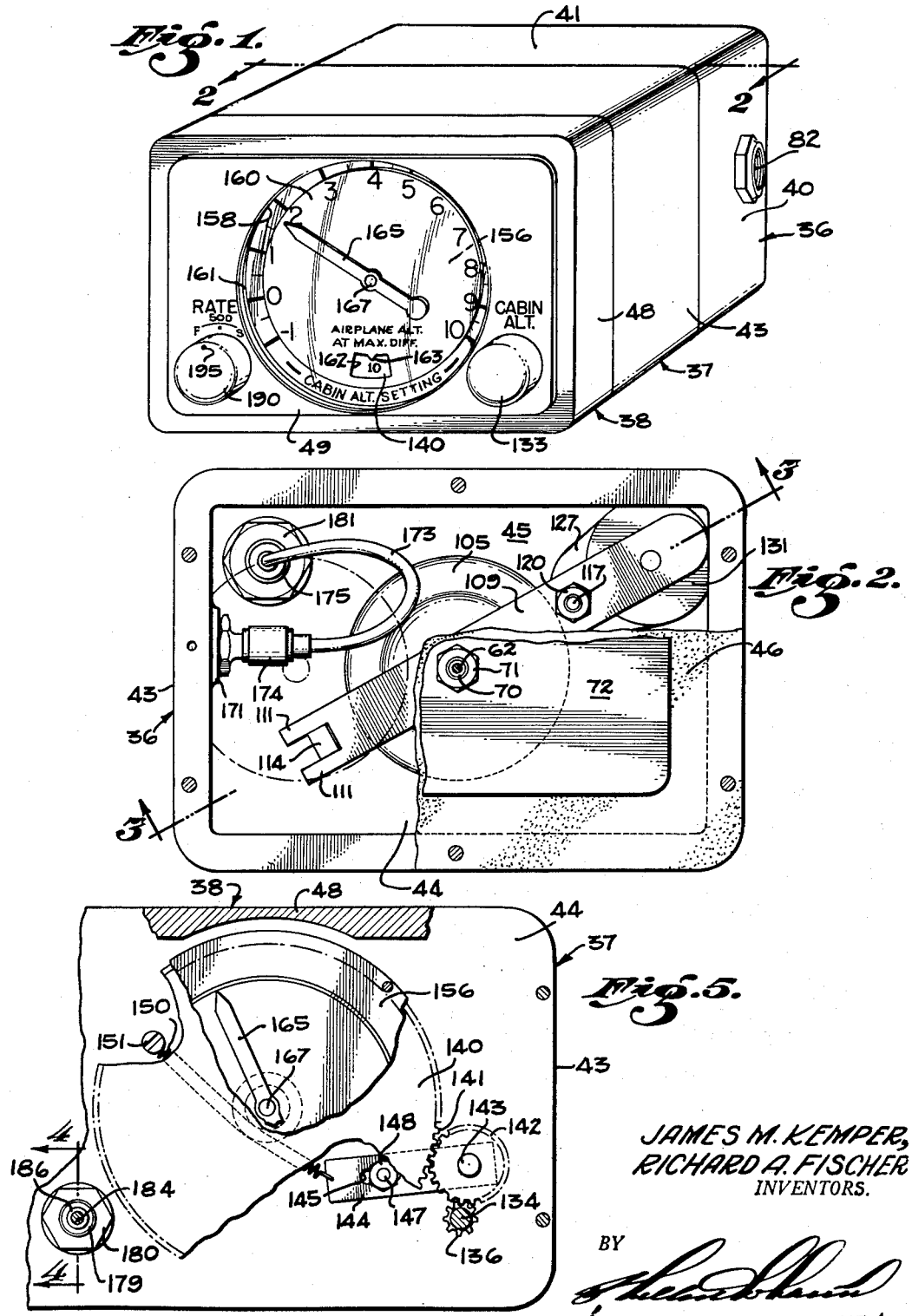
JAMES M. KEMPER,
RICHARD A. FISCHER
INVENTORS.
BY
ATTORNEY

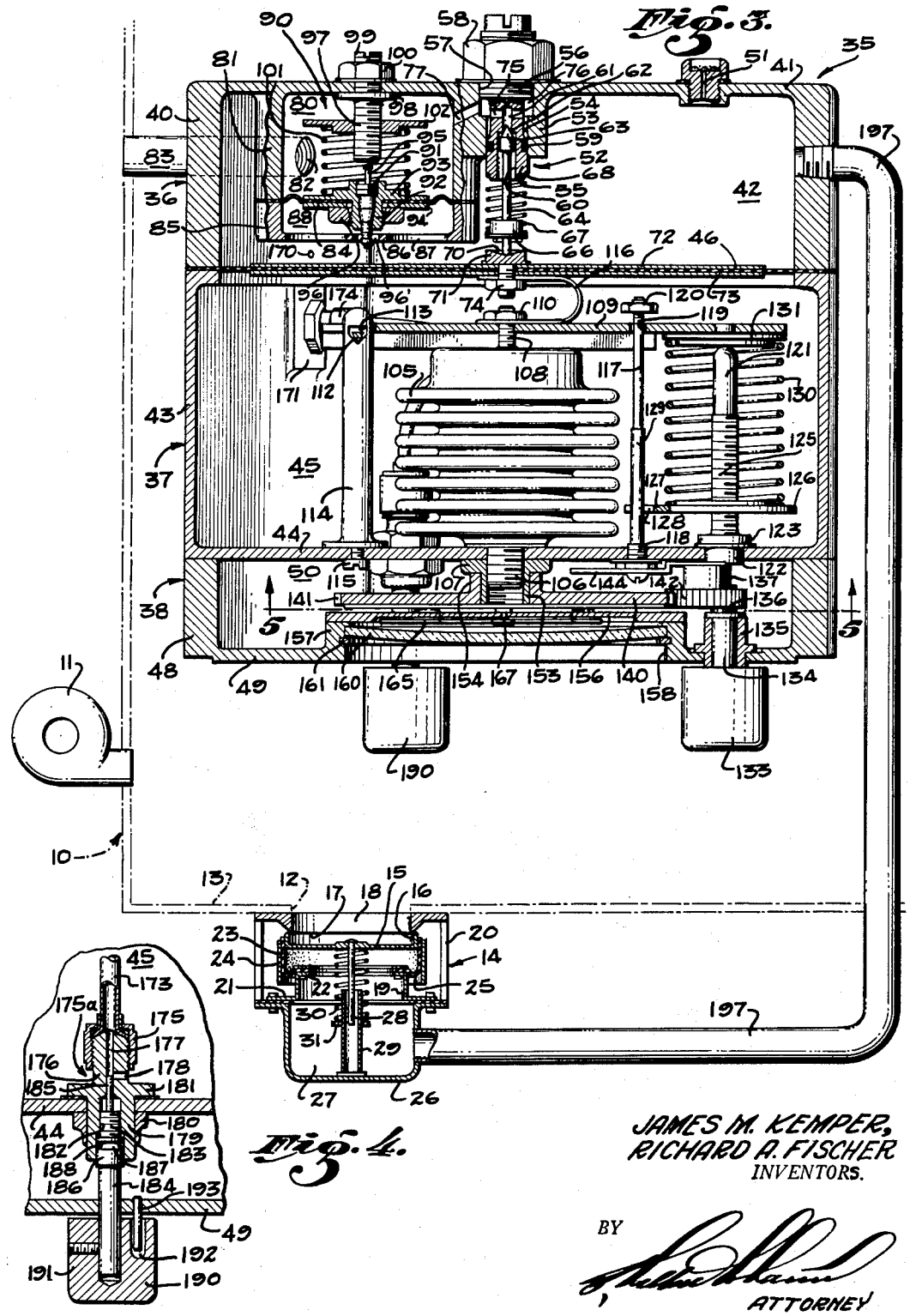

United States Patent Office 2,749,828
Patented June 12, 1956

2,749,828

PRESSURE REGULATING MECHANISM

James M. Kemper, Hollywood, and Richard A. Fischer, Los Angeles, Calif., assignors to The Garrett Corporation, Los Angeles, Calif., a corporation of California Application July 25, 1951, Serial No. 238,496

13 Claims. (Cl. 98—1.5)

This invention relates generally to means for controlling the pressurized ventilation of an enclosure, and relates more particularly to means for maintaining the desired air pressure within the enclosure under various operating conditions.

While the invention has particular utility in connection with pressurized ventilation of aircraft cabins and the like, and is shown and described embodied in such an installation, it is to be understood that its utility is not confined thereto.

When the term "aircraft" is used herein, it is to be understood that it is intended to include any device which passes through the air.

It is sometimes highly desirable to produce a gradual change in the air pressure within an aircraft during its flight from one altitude to another, as from a lower altitude airport to a higher one, or vice versa, and it is, therefore, an object of the present invention to provide means by which the air pressure within an aircraft cabin or enclosure may be automatically changed at a predetermined rate. Thus, discomfort or harm to the occupants of the aircraft is avoided.

It is another object of the present invention to provide means of this character whereby the pressure within an aircraft cabin or enclosure may be changed at a gradual preselected rate during flight so that it will have reached a value substantially that of the ambient atmospheric pressure at the terminal airport. Thus, upon landing at an airport situated at a higher or lower altitude than the starting point of the flight, the occupant or occupants of the craft will find the atmospheric pressure at the terminal airport substantially the same as that within the aircraft when it lands at said terminal airport, thus avoiding any sudden and uncomfortable pressure change for the occupants at said airport when landing and leaving the aircraft.

It is a further object to control the pressure in pressurized cabins in such manner as will permit the selection of a desired pressure within the cabin and also a desired rate of pressure change within the cabin whereby changes in pressure to which occupants of the cabin are subjected will not be so abrupt or rapid as to cause discomfort.

Let it be supposed that an aircraft upon leaving an airport at one altitude is to land at a field of different altitude within a given period of time. The occupants of the cabin are subject to a pressure change, produced gradually, so that when the second landing field is reached, the pressure to which the occupants are subjected within the aircraft cabin will correspond to the atmospheric pressure at the second landing field. During the flight from the first field to the second field, although the aircraft may rise to an altitude considerably above the altitude of either landing field, the occupants of the pressurized cabin will not be conscious of this fact, but will be subjected to a reduced pressure no greater than that corresponding to the altitude of the highest of the two landing fields.

Another object of the invention is to provide a cabin structure protective means or supplementary control which functions to relieve excessive cabin pressure if it should exceed a safe value, based upon the structural characteristics of the cabin as where the aircraft may have to ascend to a considerable height to avoid high mountains, storms, or for any other reason.

Still another object of the invention is to provide means which prevents the differential of pressure between that in the enclosure and ambient pressure from exceeding a predetermined maximum value.

A further object of the invention is to provide mechanism of this character which will over-ride other controls.

A still further object is to provide a device of this character wherein the differential pressure responsive means is located in the control chamber.

Another object of the invention is to provide apparatus of this character which is pneumatic in operation.

Still another object of the invention is to provide indicator means for the mechanism.

A further object of the invention is to provide indicating means for indicating maximum flight altitude for the selected cabin pressurization.

A still further object of the invention is to provide means for indicating the airplane altitude at which the differential control will take over and above which the selected pressure no longer will be maintained in the cabin.

Other objects of the invention are to provide a device of this character that is relatively simple and compact in construction; i. e., a self-contained unit that is reliable in operation.

Further objects and advantages of the invention will appear from the following part of the specification.

Referring to the drawings, which are for illustrative purposes only:

Fig. 1 is an external perspective view of the unit;

Fig. 2 is a view taken on line 2—2 of Fig. 1 with portions of the diaphragm broken away;

Fig. 3 is a sectional view of the control pressure mechanism embodying the invention;

Fig. 4 is a fragmentary section taken on line 4—4 of Fig. 5; and

Fig. 5 is a view, partially in section, taken on line 5—5 of Fig. 3 and with portions of the mechanism broken away.

Referring more particularly to the drawing, there is shown an enclosure or cabin which is indicated generally at 10, supplied by air under pressure by a suitable pump or supercharger 11 operated by any suitable source of power, not shown, for maintaining a flow of air through the cabin, for purposes of ventilation. The cabin is provided with an outlet opening 12, in a wall 13 thereof, said outlet being controlled by an outflow valve, indicated generally at 14 in Fig. 3. The outflow valve 14 constitutes a means for regulating the pressure in the cabin to a value which corresponds to the pressure selected by the control point setting mechanism and is an example of one type of outflow valve which may be used in connection with the control mechanism which will be hereinafter described. Other types of outflow valves may be used, another example being that disclosed in the patent to Kemper No. 2,463,491.

The valve 14 will be but briefly described herein, inasmuch as a valve of this type is fully shown and described in the Arthur et al. Patent No. 2,531,100.

This valve comprises an outwardly opening balanced valve member 15 in the general shape of a shallow cup, said valve member having a peripheral flange 16 having a thin or narrow edge engageable with a seat 17 attached to the cabin wall and having an opening 18 which registers with the opening 12. An annular member 19, generally Z-shaped in cross section, is supported in spaced relation to the valve seat by means of spacers 20 through which bolts, not shown, pass.

The member 19 includes an outwardly extending annular flange 21 secured by the above referred-to bolts. The Z-shaped member 19 also includes an annular inturned flange 22 to which one end of a flexible diaphragm 23 is secured. The other end of the diaphragm is connected to the valve member 15 by means of an annular collar 24. The diaphragm includes a generally U-shaped portion 25 in the space between the member 19 and the collar 24, said U-shaped portion 25 rolling as the valve member 15 moves axially. A generally cup-shaped cover 26 is attached to the flange 21 and defines, with the member 19, diaphragm 23 and valve member 15, a pressure chamber 27.

The valve 15 is adapted for axial movement and is provided with a stem 28 suitably mounted in a guide 29. A light spring 30, which reacts between the valve member 15 and a collar 31 on the guide 29, urges the valve member 15 in the closing direction.

Mechanism for setting the pressure in the chamber 27 is indicated generally at 35 and comprising a housing having three sections, indicated generally at 36, 37 and 38. The section 36 has side walls 40 and an outer end wall 41 defining a control pressure chamber 42. The mid-section 37 is provided with side walls 43 and an end wall 44, said walls defining a chamber 45 which, for convenience, will be termed "a back-up chamber." The chambers 45 and 42 are separated by a flexible diaphragm 46, Figs. 2 and 3, marginally clamped between the adjacent ends of the walls 40 and 43 of the respective sections 36 and 37.

The section 38 also has side walls 48 and an end wall 49 defining a chamber 50.

The diaphragm 46 is a differential pressure responsive movable wall or element and is part of the pressure differential regulating mechanism for controlling the difference in pressure between the chambers 42 and 45, Fig. 3.

Air is bled into the chamber 42 from a source of higher pressure, which is shown as the cabin interior, but may be any source of higher pressure air, through a restricted calibrated bleed 51 and escape of air is controlled by a valve, indicated generally at 52.

The valve 52 comprises a valve cage 53 having a bore 54 therein, for slidable reception of an adjustable valve seat 55 having an enlarged threaded portion 56 adjacent the outer end, said threaded portion 56 being threadably received in an enlarged bore 57 co-axial with the bore 54. The valve seat member 55 is held in adjusted positions by a lock nut 58 on the enlarged threaded portion 56 and an O ring or seal 59 is located in a groove in the valve seat member 55 for preventing the passage of air between the seat member 55 and the wall of the bore 54.

The valve seat member 55 has an axial bore 60 therein extending from the lower end, as shown in Fig. 3, and is provided with a reduced diameter bore 61 above said bore 60 so as to form a shoulder or valve seat 62 cooperable with the conical seat engaging portion 63 of a movable valve member 64, the seat engaging head is profiled in cross section so as to have a plurality of sides to, thereby, permit the flow of air past said valve when said valve is open. The valve member 64 is provided adjacent its lower end with a spring retainer 66 for reception of one end of a spring 67, the opposite end of the spring 67 abuts against a shoulder 68 provided on the seat member 55, said spring 67 urging the valve member 64 away from the seat. The lower end of the valve member 64 is received in a conical recess 70 in the head 71 of a bolt which secures a pair of plates 72 and 73 on opposite sides of the diaphragm 46 to, thereby, reenforce the central area of said diaphragm, said bolt having a threaded portion on which is received a nut 74 for securing the parts together. Movement of the diaphragm in the upward direction, as shown in Fig. 3, will move the valve member 64 in the valve closing direction and movement of the diaphragm in the opposite direction will result in opening movement of the valve member by reason of the action of spring 67.

When the valve member 64 is off the seat 54, air from the chamber 42 flows through the bores 60 and 61 through a cross bore 75 into an annular chamber 76 about the upper end of the seat member 55 and thence through a passage 77 in the valve cage 53. The passage 77 communicates with a chamber 80 defined by an annular wall 81 which extends from the end wall 41 of section 36. Chamber 80 has an outlet 82 which is adapted to be connected with a region of lower pressure, such as ambient atmosphere, by a conduit 83. The inner end of chamber 80 is closed by a flexible diaphragm 84 which is marginally clamped between the wall 81 and the adjacent end of a cap 85 in the shape of a shallow cup. The bottom wall 86 of the cap 85 is provided with openings 87 so that the interior 88 is provided with the same pressure as that in the chamber 42 so that the diaphragm 84 is subjected on one side to control chamber pressure, the pressure in chamber 42, and on the opposite side to atmospheric pressure which prevails in the chamber 80.

The diaphragm 84 comprises an element of differential pressure responsive means, indicated generally at 90, and carries a valve indicated generally at 91. The valve 91 has a valve body 92 which extends through the diaphragm 84. The valve body 92 includes a flange portion 93 on one side of the diaphragm 84 and a central area of said diaphragm 84 is clamped between said flange 93 and a washer 94 on the opposite side of said diaphragm, the parts being secured together by a nut 96 threaded on to that portion of the valve body 92 which extends through the diaphragm. The valve 91 may be of any suitable type but is shown as being a "Schrader" which has a stem 95 within the chamber 80 and a part which extends outwardly of the body 92 and through an opening 96' in the wall 86 of the cap 85. Within the chamber 80 is a valve engaging stud 97 in axial alignment with the valve 91 and having its inner end disposed adjacent the free end of the valve stem 95. The stud 97 is provided with a flange 98 adjacent the outer end and said flange engages the inner side of the wall 41. The stud 97 is provided with screw threads and a threaded outer end portion 99 extends through the wall 41 for threadable reception of a nut 100 which secures the stud in position. A spring 101 reacts between the flange 93 of the valve body 92 and a spring retainer 102 threadably received on the stud 97, said spring 101 urging the valve 91 away from the stud 97 under certain operating conditions so that said valve will be closed. The spring 101 will, however, yield under a predetermined pressure differential across the diaphragm 84 so that the valve stem 95 will engage the adjacent end of the stud 97 and effect opening of the valve 91 so that air may pass from the chamber 42 into chamber 80 and thence escape to atmosphere through the outlet 82.

Within the chamber 45, and subjected to the absolute pressure thereof, is absolute pressure responsive means shown as comprising an evacuated bellows 105. One end of the bellows is provided with a threaded stud 106 which extends through the wall 44 and is secured by a nut 107. The opposite end of the bellows 105 is movable and is provided with a threaded projection 108 which extends through a lever 109, there being a nut 110 securing the said movable end of the bellows 105 to the lever 109. The threaded projection 108 is disposed axially of the bellows 105 and also axially with respect to the bolt 71 and pilot valve member 64, the connection between the bellows 105 and the lever 109 being intermediate the ends of said lever.

One end of the lever 109 is forked, as best shown in Fig. 2, and between the side members 111 of the forked end is a triangular pivot pin 112, Fig. 3, received in an opening 113 provided therefor in the upper end of a support 114 secured to the wall 44 of the section 37 by any suitable means, shown as a screw 115. The lever 109 is connected with the diaphragm 46 by means of a U-shaped spring 116 having one arm secured beneath the nut 74 of the bolt 71 and the other arm secured beneath nut 110 of the threaded projection 108. Thus the absolute pressure responsive device 105 is connected to the pilot valve through a yielding connection.

Movement of the free end of lever 109 is limited in one direction by a stop comprising a bolt 117 having a fitted end 118 screwed into an opening provided therefor in wall 144. The bolt 117 has an end portion which extends through an opening 119 in the lever 109, the opening 109 being of larger diameter than the diameter of the bolt portion 117 received therein. A nut 120 on the threaded free-end of the bolt 117 is adapted to be engaged by the adjacent portion of the lever 109 for limiting upward movement, as shown in Fig. 3, of said lever. Movement of the free-end of the lever in the opposite direction is limited by a stop bolt 12, said bolt has an enlarged portion 122 journaled in the wall 44 and there is a flange 123 on the inner side of wall 44 which limits longitudinal movement of the bolt 121 outwardly. The bolt 121 is provided with a threaded portion 125 on which is threadably mounted a spring retainer 126 having a radially extended portion 127 provided with a notch 128 in which is received an enlarged portion 129 of the bolt 117. The spring retainer 126 is adapted to move longitudinally on the adjustment bolt 121 and also is adapted to move longitudinally with respect to the bolt 117, the latter preventing rotation of said spring retainer on the bolt 121. A spring 130 has one end retained by the spring retainer 126, the opposite end of said spring being retained by spring retainer 131 secured to the free end portion of the lever 109 and rotation of the bolt 121 will effect variations in the loading of the spring 130. Downward movement of the free end of lever 109 is limited by engagement of the bottom surface of retainer 131 with the adjacent free end of the bolt 121. It will be noted that the spring 130 urges the free end of lever 109 in a direction urging expansion of the bellows 105.

Rotation of the bolt 121 to vary the loading of spring 130 is effected by means of a knob 133 having a shaft 134 journaled in a bearing 135 which is secured in an opening provided therefor in the wall 49 of section 38. The shaft 34 is provided with a gear 136 and there is an extension 137 of said shaft having a splined end, not shown, received in a splined socket in the adjacent end of bolt 121 so that rotation of knob 133 will effect corresponding rotation of the bolt 121.

Means for indicating the cabin pressure to be obtained includes a rotatable disc 140 having teeth 141 about its periphery. There is an intermediate gear 142 rotatable on a shaft 143, Fig. 5, having one end secured to a bracket 144 having an elongated slot 145 therein. The slot 145 receives an extension 147 of bolt 117 and is secured in position by a nut 148. The bracket 144 is movable on the extension 147 and is urged leftwardly, Fig. 5, by a spring 150 having one end secured to said bracket and having the other end fixed to a screw 151. The spring 150 urges the gear into mesh with the gears 136 and 140.

Disc 140 is rotatably mounted on a bushing portion 153 which forms an extension of the nut 107, said disc having an axial opening provided with an axially extending flange portion 154 which is carried on the bushing 153. In front of the disc 140 is a plate or dial 156 secured by screws or the like to an annular flange 157 disposed about an opening 158 in the wall 49, there being a glass 160 closing the opening 158, said glass being secured in position by a snap ring 161. The dial face is provided with an opening 162 through which numerals on the disc 140 are exposed, the pointer 163 at said opening 162 indicates the altitude at which the differential control will take over. It is to be noted that the glass 160 is spaced from the dial 156 and that the dial 156 has a series of calibrations thereon which are numbered. An arrow 165 is mounted in front of the face of the dial 156 and has a shaft 167 which extends through a small axial opening in the dial 156 and is frictionally received in an axial opening in the disc 140. The disc 140 and the arrow 165 are adapted to move together and the arrow indicates the cabin altitude selected by knob 133.

There is a bleed connection between the chambers 42 and 45, said connection opening into the chamber 42 at the orifice 170, there being a passage, not shown, from said orifice into a boss 171 on the inner side of the wall 43 of section 37. A tube 173 is connected to the passage in boss 171 by a fixture 174 of well-known character. The opposite end of the tube 173 has a fixture 175, Figs. 2 and 4, which is connected to a valve 175a which has a body 176 having an axial passage 177 therein communicating with a lateral passage 178 opening into the chamber 45. The valve body has a portion 179 which extends through wall 44 and the valve body is secured by a nut 180 on said extension 179, said nut 180 being threaded on said extension 179 and the wall 44 is clamped between the said nut and a flange 181 on the opposite side of said wall. The extension 179 has an enlarged axial bore 182 which is internally threaded and which is adapted to receive a threaded end portion 183 of a movable valve member 184, there being a valve pin 185 which projects from the threaded end of the valve member and is received in the bore 177 which communicates with the enlarged bore 182. The pin 185 is adapted to variably restrict the bores 177 and 178. The valve member 184 is provided with an enlarged portion 186 received in an enlargement of bore 182. The portion 186 is provided with an annular groove 187 having an O ring 188 therein to provide a seal for the valve 184. The valve 184 projects outwardly of the wall 49 of section 38 and is provided with a knob 190 which is secured thereto by a set screw 191 or by any other suitable means. The inner side of knob 190 is provided with an arcuate notch 192 in which is received a portion of a pin 193 which is suitably secured in an opening provided therefor in wall 49. The length of the arcuate notch 192 determines the amount of rotation of the valve 184, as best shown in Fig. 1. The knob is provided with an indicating mark 195 which is cooperable with the rate marks on the wall 49 which indicates the direction to turn the knob 190 for faster or slower rate of change.

The control chamber 42 is connected to the chamber 27 of the valve unit 14 by means of a conduit 197.

*Operation of the mechanism*

It will be understood, of course, that the pressure in the control chamber 42, which is transmitted to the chamber 27 of the outflow valve 14, is used as a reference pressure, and this pressure plus the force of the spring 30 on the valve member 15 determines the pressure value at which the outflow valve 14 governs the cabin pressure. Hence, the outflow valve 14 controls cabin pressure and the mechanism 35 is a means for changing the operating point of outflow valve 14.

Assuming that the aircraft is on the ground, the ground condition of the mechanism is as follows: Ambient atmospheric pressure exists in the chamber 42 and in chamber 45 since, it is connected to chamber 42 through the connections 170, 173, 177 and 178. Due to the pressure in chamber 45, the evacuated bellows 105 is completely collapsed and, as a result, the free end of the lever 109 is urged into engagement with the free end of the bolt 121 which serves as a stop limiting clockwise movement, as shown in Fig. 3, of the lever 109. When the lever is in this position, the pilot valve member or pin assembly connected with the diaphragm 46, is in a wide open position. At this time the chamber 42 is freely connected with ambient atmosphere through the pilot valve, passage 77, chamber 80, and connection 83 so that ambient atmospheric pressure exists in said chamber 42 and also in the chamber 27 of the outflow valve unit 14.

In preparation for a flight from a lower altitude airport to a higher altitude airport, the pressure altitude selector knob 133 is adjusted to the pressure altitude of the terminal airport or the pressure altitude which it is desired to maintain isobarically in the cabin. This pressure altitude will be indicated by the proper numeral on dial face 156 by pointer 165. The desired rate of change of pressure altitude may also be set at this time by adjusting the rate selector knob 190 to fix the size of the orifice of the valve 175a, said adjustment of the rate selector knob positioning the pin 185. Under these conditions no change occurs until the airplane starts to gain altitude. When the airplane takes off from the landing field and altitude is gained, a drop occurs in the ambient atmospheric pressure which is transmitted to the control chamber 42 through the open needle valve 52. Should the set rate be exceeded the pressure in the chamber 42 will drop below the pressure existing in the chamber 45, and a pressure differential will be set up across the orifice of the valve 175a as well as across the diaphragm 46. This will cause the diaphragm to move in a direction against the tension of the spring 116 to move the valve 52 in the closing direction. There will then be an inter-action between the forces acting on the diaphragm 46 and the action of the spring 116 which will result in positioning the meter pin 64 so as to maintain a substantially constant differential pressure across the orifice of the valve 175a.

Except for sudden surges, there is very little movement of the parts but there is a continual application of forces between them. The differential pressure between the chamber 42 and the chamber 45 will usually remain at a substantially constant level, for example, about .5" H₂O.

It will be understood that by thus continuing to maintain a substantially constant differential pressure across the orifice of the valve 175a, the rate of change in pressure in the back-up chamber 45 is determined and, consequently, the rate of change in pressure in the control chamber and the pressure in the pressure chamber 27 behind the sensing valve 15 of the cabin outflow valve unit 14 is also determined. By gradually changing the pressure in the pressure chamber 27, by means of the control point setting mechanism, the cabin pressure will be changed from one pressure altitude to another. The rate at which the cabin pressure will change from one value to another is determined by the setting of the rate valve 175a.

As the pressure in the chamber 45 falls, it will reach a value where the force in the bellows 105 is no longer able to balance the force which has been set into the isobaric spring 130.

The right hand or free end, as shown in Fig. 3, of the lever 109 is thereupon moved counter-clockwise to a position intermediate the stops 121 and 120, thereby relaxing the force of spring 116. At this time the pressures in the chambers 42 and 45 are suitably equal and the cabin pressure is maintained at the desired value, for example, at about 2.5" H₂O higher than the pressure in the control chamber 42 as determined by the pressure or force exerted on the slave valve member 15 by the spring 30.

Under the conditions of isobaric control an equilibrium condition exists wherein there is no differential of pressure between the pressures prevailing in the chambers 42 and 45 due to the balanced action of the isobaric bellows 105 and the isobaric spring 130 acting through the lever 109 and the valve spring 116 to re-position the valve 64 in response to any change in the pressure in the chamber 42.

When a flight is to be made from a higher to a lower altitude airport, the altitude selector knob 133 is adjusted for the terminal airport pressure and is moved in a direction to increase the force of spring 130 on the isobaric bellows 105, said bellows being expanded to a point whereat the free end of the lever 109 engages the stop 120, thereby limiting further expansion of said bellows. The action of the device is then the reverse from that described in connection with the flight from a low altitude airport to a higher altitude airport. If necessary, the rate selector valve is also adjusted by means of the knob 190 to provide the required rate of pressure change. The setting is such that the desired pressure change will occur over a predetermined period of time which is less than the time required for the flight between the starting point and the destination airport.

Should the circumstances be such that the differential between cabin pressure and ambient pressure reaches a predetermined value, the differential over-ride will become effective. Actually the differential over-ride 90 takes over when the differential of pressure between that in the control chamber 42 and ambient atmospheric pressure, which prevails in chamber 80, reaches the set predetermined value. At this time, the pressure in chamber 42, exerted on one side of the diaphragm 84, is sufficient to overcome the atmospheric pressure on the opposite side of the valve, plus the force of spring 101, to cause said diaphragm 84 to move inwardly of chamber 80. It is to be understood that when the differential control 90 is not effective, the free end of the valve body 92 is in engagement with the wall 86 which thereby limits outward movement of said diaphragm. When the diaphragm 84 is moved inwardly of the chamber 80, the valve pin 95 engages the adjacent end of the bolt 97 to effect opening of the Schrader valve so that air from chamber 42 will escape into the chamber 80 and, thence, to atmosphere. As long as the aircraft is above the predetermined altitude above referred to, the differential pressure control device will control the pressure in the control chamber 42 and, thus, control the setting of valve 14 for controlling the pressure in the aircraft cabin. This differential pressure control mechanism provides a safety factor which prevents the cabin pressure from exceeding a predetermined value with respect to ambient pressure so that danger of rupturing of the cabin walls is thereby eliminated. When the differential over-ride takes control of the pressure in chamber 42, isobaric bellows will have further expanded to close valve 52 and the constant cabin pressure controlled and the rate of change control will not be maintained. However, when the aircraft is above the said predetermined altitude and is descending, the rate control will then again come into operation and acting through diaphragm 46 and spring 116 modulate valve 52 to prevent the cabin pressure from increasing faster than the rate for which the mechanism is set.

We claim:

1. Pressure control mechanism: means defining a pair of pressure chambers having a restricted connection therebetween; and means for controlling the pressure in one of said chambers comprising, pilot valve means having a movable valve member and a pressure responsive element responsive to variations in the differential of pressures in said chambers for controlling said valve element, said valve member controlling the flow of fluid relative to said one chamber, pressure responsive means having one side exposed to pressure in said one chamber and the opposite side exposed to a variable reference pressure for controlling the pressure therein and pressure responsive means in the other chamber cooperable with the pressure responsive element for controlling said valve member.

2. In pressure control mechanism: means defining a pair of pressure chambers having a restricted connection therebetween; and means for controlling the pressure in one of said chambers comprising, a valve controlling the flow of fluid relative to said one chamber, a pressure responsive element responsive to variations in the differential of pressures in said chambers for controlling said valve, a second valve for controlling the flow of fluid relative to said one chamber and arranged in parallel with the first mentioned valve, differential pressure responsive means having one side exposed to pressure in said one chamber and the opposite side exposed to ambient pressure for controlling the second valve, and pressure responsive means having one side exposed to pressure in the other chamber and having an operable connection with the first mentioned valve.

3. In pressure control mechanism: means defining a pair of pressure chambers having a restricted connection therebetween; and means for controlling the pressure in one of said chambers comprising valve means for controlling the flow of fluid relative to said one chamber, said valve means including a differential pressure responsive element subjected on one side to pressure in one of said chambers and on the opposite side to ambient atmospheric pressure, and means, including an absolute pressure responsive element subjected to pressure in the other of said chambers for controlling the flow of fluid relative to said one chamber to thereby control the pressure therein.

4. The invention defined by the claim 3 wherein the means for controlling the pressure in said one chamber also includes a differential pressure responsive element responsive to variations in the differential of pressure in said chambers.

5. In a pressure control mechanism: walls defining a control pressure chamber having an inlet passage and an outlet passage; means for controlling the pressure in said control chamber including a differential pressure sensitive element subjected on one side to pressure in said control chamber and adapted to control one of said passages; a restricted connection between the other side of said element and the control chamber, said connection including a relatively large capacity portion interposed therein; and differential pressure responsive means subjected on one side to pressure in the control chamber and on the other side to ambient atmospheric pressure; and absolute pressure responsive means subjected to the same pressure as the other side of said element and adapted to cooperate with said differential responsive element for controlling said one passage.

6. In a pressure control mechanism: walls defining a control pressure chamber having an inlet passage and an outlet passage; means for controlling the pressure in said control chamber including a differential pressure sensitive element subjected on one side to pressure in said control chamber and adapted to control one of said passages; a restricted connection between the other side of said element and the control chamber, said connection including a relatively large capacity portion interposed therein, the other side of said element being exposed to the pressure in said connection; an absolute pressure responsive device subjected to the same pressure as said other side of said element and adapted to cooperate with said differential pressure responsive element in controlling said one passage; and means limiting the pressure in said control pressure chamber to a predetermined differential pressure with respect to ambient atmosphere.

7. In pressure control mechanism: means defining a pair of pressure chambers having a restricted connection therebetween; means for controlling the pressure in one of said chambers comprising, pilot valve means having a valve and a pressure responsive element controlling said valve, said pressure responsive element being responsive to variations in the differential of pressures in said chambers, pressure responsive means having one side exposed to pressure in the other of said chambers and cooperable with the pressure responsive element in controlling said pilot valve; and over-riding means for over-riding the control effected by the pilot valve means, said over-riding means including a pressure responsive device responsive to variations in the differential of pressure between that in the one chamber and ambient atmosphere.

8. Pressure control mechanism for an aircraft cabin, comprising: wall means defining a control pressure chamber and a back-up chamber; a valve, including a movable valve member, for controlling the flow of fluid relative to the control chamber; passage means connecting said chambers; adjustable means for variably restricting said passage means; a differential pressure responsive element for controlling said valve member and responsive to variations in the differential of pressure between that in the control chamber and the back-up chamber; differential pressure responsive means responsive to the differential of pressures between that in the control pressure chamber and ambient atmosphere for controlling the flow of fluid relative to said control pressure chamber; an absolute pressure responsive device responsive to the absolute pressure in the back-up chamber; a lever pivoted adjacent one end and having one end operably connected intermediate its ends to the pressure responsive device; a link spring connected to the other end of the lever and connected to the differential pressure responsive element; a pair of stop members spaced apart relative to the path of movement of said lever for limiting the movement of said lever in both directions; means for loading the pressure responsive device; and adjustable means for varying said loading.

9. The invention defined by claim 8 wherein the differential pressure responsive means includes a valve arranged in parallel with the first mentioned valve.

10. Pressure control mechanism for an aircraft cabin, comprising: wall means defining a control pressure chamber and a back-up chamber; a valve, including a movable valve member, for controlling the flow of fluid relative to the control chamber; passage means connecting said chambers; adjustable means for variably restricting said passage means; a differential pressure responsive element for controlling said valve member and responsive to variations in the differential of pressure between that in the control chamber and the back-up chamber; differential pressure responsive means responsive to the differential of pressures between that in the control pressure chamber and ambient atmosphere for controlling the flow of fluid relative to said control pressure chamber; an absolute pressure responsive device responsive to the absolute pressure in the back-up chamber; a lever pivoted at one end and operably connected intermediate its ends to the pressure responsive device; a link spring connected to the other end of the lever and connected to the differential pressure responsive element; a pair of stop members spaced apart relative to the path of movement of said lever for limiting the movement of said lever in both directions; means for loading the pressure responsive device; and dial mechanism including a dial plate having an opening therein and having, on the outer sides, markings indicating various altitudes, a disc rotatable behind said dial and having a series of the markings thereon arranged to be brought into register with the opening in the dial plate as said disc is rotated, said markings also indicating altitudes, means connecting the adjustable means for varying the loading of the pressure responsive device and said disk, and a pointer connected with the disc and adapted to point to various markings on the face of the dial plate, said pointer being movable in accordance with the movements of the disc.

11. In pressure control mechanism for an enclosure having an opening therein for the flow of fluid therethrough: valve means for controlling said opening and having a pressure chamber, the variations in the pressure in said chamber controlling movements of said valve means; means for controlling the pressure in said chamber comprising means defining a pair of pressure chambers having a restricted connection therebetween; means connecting one of said pair of chambers with the pressure chamber of said valve and means for controlling the pressure in said one chamber comprising, pilot valve means including a pressure responsive element responsive to variations in the differential of pressures in said pair of chambers for controlling the flow of fluid relative to said one chamber, differential pressure control means responsive to variations in the differential of pressure between that in said one chamber and external pressure for controlling the pressure in said one chamber, and pressure responsive means having one side exposed to pressure in the other of said pair of chambers for controlling the pressure therein.

12. Pressure control mechanism: means defining a pair of pressure chambers having a restricted connection therebetween; and means for controlling the pressure in one of said chambers comprising, pilot valve means having a movable valve member and a pressure responsive element responsive to variations in the differential of pressures in said chambers for controlling said valve element, said valve element controlling the flow of fluid relative to said one chamber, pressure responsive means having one side exposed to pressure in said one chamber and the other side exposed to ambient pressure for controlling the pressure therein and pressure responsive means in the other chamber cooperable with the pressure responsive element for controlling said valve member.

13. In pressure control mechanism: means defining a pair of pressure chambers having a restricted connection therebetween; and means for controlling the pressure in one of said chambers comprising, a valve controlling the flow of fluid relative to said one chamber, a pressure responsive element responsive to variations in the differential of pressures in said chambers for controlling said valve, a second valve for controlling the flow of fluid relative to said one chamber and arranged in parallel with the first mentioned valve, differential pressure responsive means having one side exposed to pressure in said one chamber and the opposite side exposed to ambient pressure for controlling the second valve, and pressure responsive means subjected only to pressure in the other chamber and having an operable connection with the first mentioned valve.

References Cited in the file of this patent

UNITED STATES PATENTS

| | | |
|---|---|---|
| 2,258,826 | Torkelson | Oct. 14, 1941 |
| 2,441,592 | Paget | May 18, 1948 |
| 2,463,487 | Widgery et al. | Mar. 1, 1949 |
| 2,513,332 | Kemper | July 4, 1950 |
| 2,539,575 | George | Jan. 30, 1951 |
| 2,549,673 | Del Mar | Apr. 17, 1951 |
| 2,550,033 | Adams | Apr. 24, 1951 |
| 2,556,159 | Arthur | June 12, 1951 |
| 2,669,175 | Fischer | Feb. 16, 1954 |